United States Patent [19]

Takayanagi et al.

[11] Patent Number: 4,501,141
[45] Date of Patent: Feb. 26, 1985

[54] APPARATUS FOR MEASURING TIRE UNIFORMITY

[75] Inventors: Shigewo Takayanagi, Nagoya; Junzo Hasegawa, Obu; Hayashi Yasutaka, Nagoya; Shunichi Doi, Nagoya; Satoru Matsushima, Nagoya, all of Japan

[73] Assignees: Kabushiki Kaisha Toyota Chuo Kenkyusho; Toyota Jidosha Kabushiki Kaisha, both of Aichi, Japan

[21] Appl. No.: 440,464

[22] Filed: Nov. 9, 1982

[30] Foreign Application Priority Data

Nov. 19, 1981 [JP] Japan ................................. 56-186433

[51] Int. Cl.³ ........................................... G01M 17/02
[52] U.S. Cl. ..................................................... 73/146
[58] Field of Search ...................................... 73/147, 7

[56] References Cited

U.S. PATENT DOCUMENTS

| 2,869,362 | 1/1959 | Gough et al. | 73/146 |
| 3,552,200 | 1/1971 | Hermanns et al. | 73/146 |
| 4,458,526 | 7/1984 | Doi et al. | 73/146 |

Primary Examiner—Donald O. Woodiel
Attorney, Agent, or Firm—Blum, Kaplan, Friedman, Silberman & Beran

[57] ABSTRACT

The tire for automobiles being measured is loaded in advance by the load applying means and the drum is driven to rotate the tire. A displacement of the rotatable shaft produced in response to a variation in the radial force acting between the tire and the drum is detected as a displacement of the movable member. The movable member is movable with respect to the drum about a fulcrum which lies in or is located in the vicinity of a plane including a surface in which the drum and the tire are held against each other. Thus any influence by a moment due to a lateral force imposed on the tire can be eliminated, and the apparatus can measure a radial force variation with precision.

20 Claims, 14 Drawing Figures

APPARATUS FOR MEASURING TIRE UNIFORMITY

BACKGROUND OF THE INVENTION

1. Field of the Invention

The present invention relates to a tire uniformity measuring apparatus for measuring variations in the load imposed radially of the tire through a simple arrangement.

2. Description of the Prior Art

One of the factors which govern vibrations, noise, and drivability of a vehicle is considered to be tire uniformity, that is, the appearance, dimensions and uniform rigidity of a tire. A variety of tire uniformity measuring apparatus have heretofore been proposed and put to use for checking such tire uniformity.

Known tire uniformity measuring apparatus include a rotatable cylindrical drum for rotating a tire to be measured. The drum and the tire are spaced at a fixed interaxial distance for measuring a variation (hereinafter referred to as "R.F.V.") in a reactive force acting radially of the the tire on the drum shaft or tire shaft while the drum and the tire are in rolling movement. With the interaxial distance between the drum and the tire being fixed, the entire apparatus should have an increased rigidity. The drum should be rotated at a high speed which is a few tens of revolutions per minute. The conventional apparatus is required to have a complicated electric measuring circuit. The prior apparatus is therefore disadvantageous in that it is large in size, costly to manufacture, and requires a long period of time for measurements.

In an effort to develop a tire uniformity measuring apparatus which will solve the problems the conventional apparatus has suffered, the present inventors have made systematic experiments and theoretical analyses and as a result have devised a tire uniformity measuring apparatus as described in Japanese Patent Application No. 55-166130 (U.S. patent application No. 317,727, hereinafter referred to as "prior invention"). With such a tire uniformity measuring apparatus, the interaxial distance between the tire as it rolls under a certain load and the drum is not fixed, but the rotatable shaft to which the tire is affixed is allowed to be displaced slightly for permitting a force corresponding to the axial reactive force to be detected as a displacement of a movable member. The measuring apparatus can measure a variation in a radial force acting on a tire to a nicety under a condition approximating an actual road running condition. The measuring apparatus can also be handled with ease, is light in weight, compact and less costly to construct.

However, when the tire is subjected to a large localized deformation, a large lateral force component is generated in a surface in which the tire and the drum are held in contact with each other, and a moment due to such lateral force component results in an increased variation in R.F.V. derived, which needs to be compensated for. Accordingly, the proposed prior art apparatus has suffered from an influence by such a lateral force component.

SUMMARY OF THE INVENTION

The present inventors has continued systematic experiments and theoretical analyses in order to eliminate the difficulty with the tire uniformity measuring apparatus according to the prior invention, and has reached the present invention.

It is an object of the present invention to provide a tire uniformity measuring apparatus for accurately measuring a variation in a radial force acting on a tire while eliminating any influence by a moment due to a lateral force imposed on the tire under a condition close to an actual road driving condition.

Another object of the present invention is to provide a tire uniformity measuring apparatus for measuring a variation in only a radial force acting on a tire, the apparatus being handled with ease, light in weight, compact and inexpensive.

A tire uniformity measuring apparatus according to the present invention comprises a drum for rotatively driving a tire to be measured, a rotatable shaft having an attachment for securing the tire in position, a movable member rotatably supporting the rotatable shaft and is movable with respect to the drum about a fulcrum which lies in or is located in the vicinity of a plane including a surface in which the drum and the tire are held against each other while in rolling movement, the movable member being capable of changing a portion thereof which supports the rotatable shaft depending on a load acting between the drum and the tire, a load applying means for applying a predetermined load on the tire by changing an interaxial distance between the drum and rotatable shaft in response to movement of the drum, a displacement detecting means for detecting a displacement of the rotatable shaft as a displacement of the movable member dependent on a variation in a load applied radially of the tire while the latter is rotated by the drum, and display means for displaying the variation in the load applied radially of the tire in response to the displacement of the movable member, whereby the variation in the load applied of the tire can be measured.

With the tire uniformity measuring apparatus according to the present invention, the fulcrum about which the movable member is movable lies in or in the vicinity of the plane containing the surface in which the drum and the tire are held in contact with each other. Such an arrangement eliminates a moment arm due to a lateral tire force acting perpendicularly to the direction of rotation of the tire in the surface in which the tire and the drum are held against each other when the tire is rotated by the drum, that is, a line along which the lateral tire force acts is directed toward the fulcrum, so that any influence by the lateral tire force can be removed. Therefore, the tire uniformity measuring apparatus can accurately detect only a variation in a load imposed radially of the tire.

The tire uniformity measuring apparatus of the present invention is not required to be highly rigid, and needs no sophisticated electric measuring circuit. Therefore, the apparatus is quite simple, light in weight, compact and less costly.

Prior to describing apparatus according to embodiments of the present invention, the principles of the present invention for measuring a variation in the radial force exerted on a tire will first be described with reference to FIGS. 1a and 1b.

FIG. 1a is illustrative of an equivalent lever L utilized to explain the principles of measurement according to the conventional apparatus.

Designated at A is a fulcrum, B a point where force f acts from a tire, C a point for measuring a displacement (load), and D a center where the tire and a drum are held in contact while they are in rolling movement. The points B and C are spaced from the fulcrum A by distances $l_1$, $l_2$, respectively, and the center D is spaced from the point B by a distance R. A lateral tire force F is generated at the center D, the lateral force F being positive or negative as it may be imposed in either righthand or lefthand direction across the tire.

It is assumed that the weight of the equivalent lever and the relative load applied are respectively zero (in a state of balance), and $l_1 = l_2$.

Since the force which corresponds to a variation in the radial force (R.F.V.) exerted on the tire is expressed by f, a measured load fc at the point C can be expressed by the following equations:

$$fc = f + \Delta F \quad (1)$$

$$\Delta F = (R/l_2) F \quad (2)$$

It can be seen from the above equations that a moment RF due to a lateral force F at the point D and an effective radius R of the tire affects the radial force variation R.F.V. and the measured value fc.

In order to cancel out the influence by the moment resulting from the lateral force, it is necessary that the arm R of the moment in the equation (2) be zero as follows:

$$R \to O \Delta F = O \quad (3)$$

FIG. 1b shows a lever L' devised to meet the above relationship. More specifically, the fulcrum A is displaced to a plane in which the point D lies to reduce the arm in the moment due to the lateral force F as small as possible, so that the correct radial force can be substantially obtained.

The influence by the lateral force can be removed on the above measurement principle even when $l_1 = l_2$ to obtain the substantially correct radial force.

An example of measurement obtained on an apparatus according to the present invention will be described with reference to FIGS. 2a and 2b.

FIG. 2a illustrates a correlationship between peak-to-peak values of the waveform of radial force variations (R.F. V.) which were measured by a measuring apparatus according to the prior invention and those measured by a conventional commercially available apparatus. FIG. 2b shows a correlationship between peak-to-peak values of the R.F.V. variation waveform which were measured by a measuring apparatus according to the invention and those measured by the conventional commercially available apparatus.

Comparison between the correlationship between the radial load variation waveform measured by the measuring apparatus of the invention and that measured by the prior apparatus indicates that the correlationship at larger R.F.V. values is much better with the measuring apparatus of the present invention, and that elimination of the influence by the moment generated by the lateral tire force is clearly advantageous. Accordingly, the measuring apparatus of the present invention can produce tire uniformity evaluation values sufficiently accurately.

The present invention can be reduced to practice in the following aspects.

According to a first aspect of the invention, the movable member comprises a cantilever having one end rigidly secured to a machine base and a support on the other end rotatably supporting the rotatable shaft which is rotatable with the tire, the movable member also having at a suitable position a stress concentrating portion for allowing the movable member to move, the stress concentrating portion serving as the fulcrum about which the movable member is movable and being disposed in or in the vicinity of the plane, the stress concentrating portion being mainly deformable when the cantilever is deformed in response to a variation in a radial force acting on the tire.

With the first aspect of the invention, the stress concentrating portion is located in or in the vicinity of the plane including the surface in which the drum and the tire are held against each other for eliminating a moment arm due to a lateral tire force acting perpendicularly to the direction of rotation of the tire between the tire and the drum, or for directing a line of action of the lateral tire force toward the fulcrum to thereby remove any influence by the lateral tire force. Thus, only the variation in the radial force on the tire can be detected as a strain of the stress concentrating portion of the cantilever.

According to a second aspect, the movable member comprises a swingable arm swingably supported at one point and having on one end a support rotatably supporting the rotatable shaft which is rotatable with the tire, the swingable arm being pivotable about the fulcrum lying in or in the vicinity of the plane, the movable member being swingable in response to the variation in the radial force acting on the tire.

With the second aspect, the fulcrum of the movable member is located in or in the vicinity of the plane including the surface in which the drum and the tire contact each other for eliminating a moment arm due to a lateral tire force acting perpendicularly to the direction of rotation of the tire between the tire and the drum, or for directing a line of action of the lateral tire force toward the fulcrum to thereby remove any influence by the lateral tire force. Thus, only the variation in the radial force on the tire can be detected by a load cell as a load dependent on a displacement of one end of the movable member.

According to a third aspect of the present invention, the movable member has an adjustment mechanism at a suitable position for adjusting a distance between a support on the movable member which supports the rotatable shaft and the fulcrum.

With the third aspect, the adjustment mechanism for adjusting a distance between the support and the fulcrum allows R.F.V. to be measured in an ideal condition without being influenced by a lateral tire force for tires having different effective radii. Consequently, it is not necessary to compensate for results of measurement through electric processing for each different tire shape. The apparatus of the invention has a high degree of accuracy and versatility.

According to a fourth aspect of the invention, the load applying means is interposed between an end of the movable member which is swingably supported and a suitable position in the apparatus, whereby the tire can be imparted with a predetermined load by changing an interaxial distance between the drum and the rotatable shaft through the movable member.

With the fourth aspect, a load can be imposed on the tire without changing the position of the drum so that the drum and the tire are held against each other at a fixed surface. The fulcrum of the movable member can easily be determined with respect to the surface in which the drum is in contact with a tire having an irregular shape. The apparatus is of a simple mechanism, can be constructed with ease, and can easily be used.

BRIEF DESCRIPTION OF THE DRAWINGS

Various other objects, features and advantages of the present invention will be apparent from the following detailed description when considered in connection with the accompanying drawings, in which like reference characters designate like or corresponding parts throughout the several views, and wherein.

DESCRIPTION OF THE PREFERRED EMBODIMENTS

The present invention will be described in detail with reference to embodiments thereof.

Figure 1A:
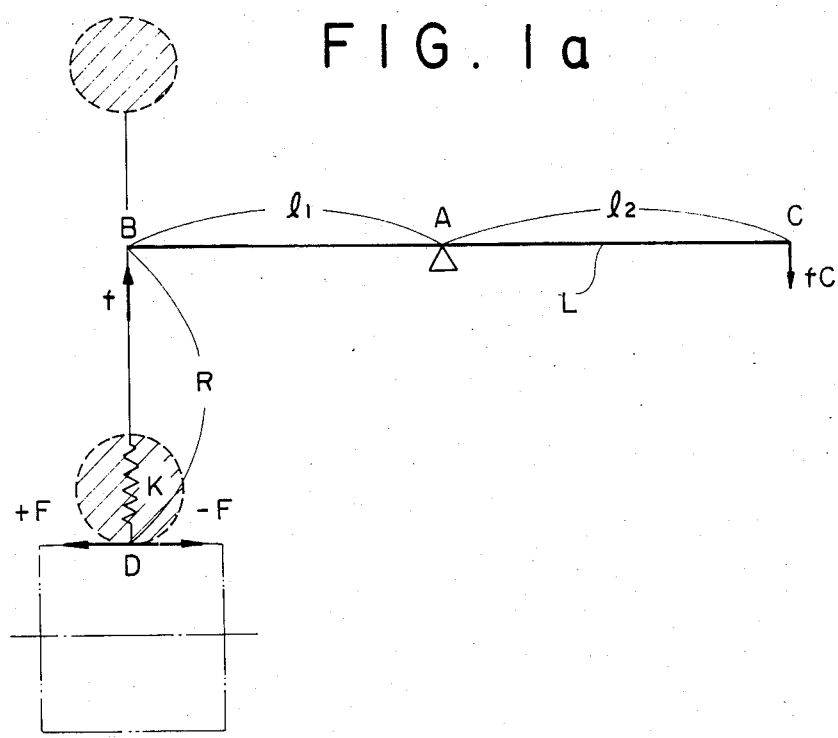
FIG. 1a, and 1b are diagrams illustrative of principles of measurement of a conventional apparatus and an apparatus according to the present invention, respectively.
Figure 1B:
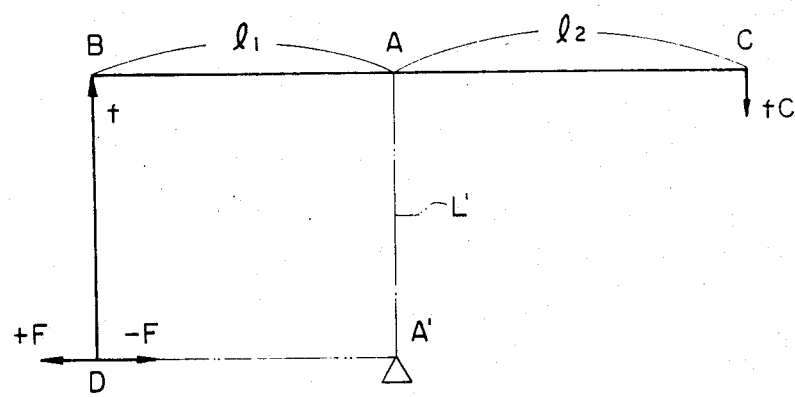
Figure 2A:
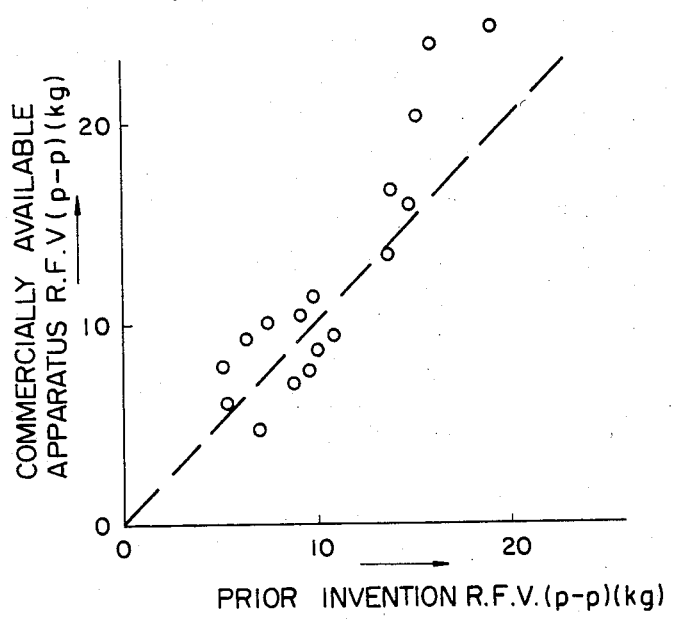
FIGS. 2a and 2b are graphs showing correlationships between an apparatus according to a prior invention and a commercially available apparatus and between an apparatus of the invention and a commercially available apparatus.
Figure 2B:
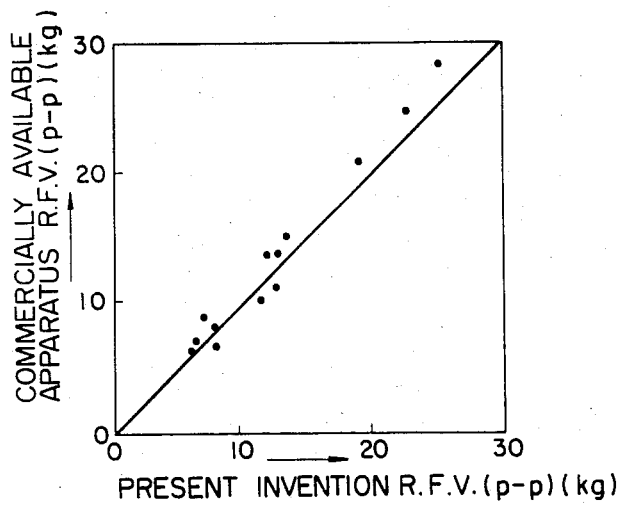
Figure 3:
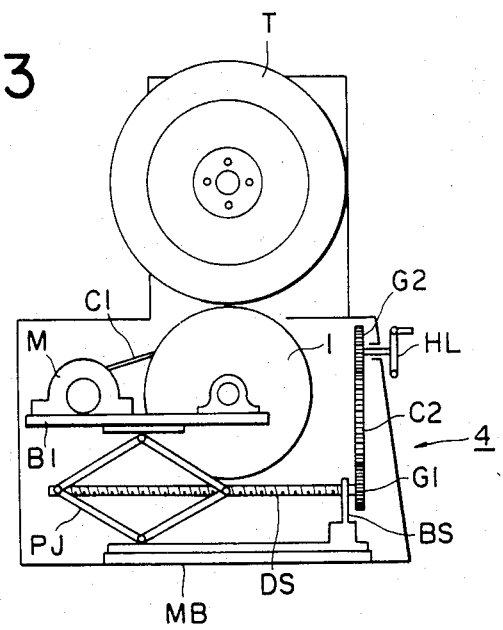
FIGS. 3 through 5 are indicative of an apparatus according to a first embodiment of the present invention, FIG. 3 being a side elevational view of the apparatus, FIG. 4 a front elevational view of the apparatus, FIG. 5 a block diagram of an electric circuit in the apparatus.

A tire uniformity measuring apparatus according to a first embodiment (first aspect) will now be described with reference to FIGS. 3 through 5.

The tire uniformity measuring apparatus according to the first embodiment belongs to the first aspect. The tire uniformity measuring apparatus comprises a drum 1 drivable through a chain C1 by a motor M mounted on a table B1 supported on a pair of pantograph-shaped jacks PJ mounted on a machine base MB, a crank-shaped movable member 3 rigidly and swingably secured to a support post at a position above the machine base which corresponds to an upper end of a surface in which the drum 1 and a tire being measured are held in contact while in rolling movement, the movable member 3 having first and second portions and a connector portion, and a rotatable shaft P rotatably supported on a distal end of the second portion of the movable member and having an attachment for fixing the tire in position. The tire uniformity measuring apparatus also includes a load applying means 4 for applying a predetermined load to the tire through the pantograph-shaped jacks PJ, a displacement detecting means 5 having strain gages SG attached to a stress concentrating portion near a center of the first portion of the movable member 3, the stress concentrating portion having a center lying in a horizontal plane containing the upper end of the surface of rolling contact between the drum and the tire, and a display means for displaying a variation in the radial force on the tire in response to a bending strain as detected by the strain gages of the displacement detecting means based on a displacement (bending stress) of the movable member.

The construction and operation of the tire uniformity measuring apparatus according to the first embodiment will be described in more detail.

The movable member 3 of the tire uniformity measuring apparatus of the first embodiment is composed of first and second portions 3a, 3c extending parallel to each other and a connector portion 3b extending perpendicularly to the first and second portions and integrating them together. The first portion 3a includes the stress concentrating portion having a center lying in a horizontal plane containing the upper end of the surface of the rotatable drum 1 which is held against the tire being measured, the first portion 3a having one end secured to a support post MH so that the center of the stress concentrating portion will be swingable. The connector portion 3b has a length which is the same as the effective radius of the tire which is measured for its uniformity. The second portion 3c extends parallel to the first portion 3a at a position spaced therefrom by a distance equal to the effective radius of the tire, the second portion 3c having on its distal end a support for rotatably supporting the tire T being measured.

The load applying means 4 serves to impose a relative load on the tire and the drum. The table B1 is supported at its center on the pair of pantograph-shaped jacks PJ installed on the machine base MB. The rotatable drum 1 which is drivable by the motor M and the chain C1 is journalled on the table B1. The tire T to be measured is located such that its axis lies on a line normal to the axis of the rotatable drum 1.

The pantograph-shaped jacks PJ can be driven by rotating a manually actuatable handle HL operatively connected through a chain C2 trained around gears G1, G2 to a drive screw DS extending through a bearing BS mounted on the machine base MB. The manually actuatable handle HL is journalled on the support post MS and positioned outside of the machine base as shown in FIG. 3. Thus, a predetermined load can be imposed on the tire T by moving the drum 1 upwardly or downwardly.

The displacement detecting means 5 is composed of the strain gages SG attached to the stress concentrating portion located approximately centrally of the first portion 3a of the crank-shaped movable member 3 which has a tire supporting device 2 on which the tire T is rotatably supported. The tire T is freely rotatable on the tire supporting device 2 on the end of the second portion 3c of the movable member 3. The first portion of the crank-shaped mavable member 3 is rigidly affixed at one end to the support post MH. The strain gages SG are attached to upper and lower faces of the constricted stress concentrating portion disposed substantially centrally of the first portion 3a so that a bending force will act in a plane defined by the axes of the drum and the tire. Since the center of the stress concentrating portion lies in the horizontal plane containing the upper end of the surface of the drum against which the tire is held while in rolling motion, the influence by the lateral tire force acting on the point in which the drum and the tire are held against each other can be eliminated as the arm of the moment due to the lateral force is zero. The strain gages SG serve to detect as a bending strain a bending stress generated in the movable member by a force applied radially of the tire on the distal end of the second portion 3c of the movable member 3. The bending load or the load imposed in the radial direction of the tire can be derived from the detected bending strain. The constricted portion of the first portion 3a of the movable member 3 should be strong enough to withstand the force imposed on the distal end of the movable member while allowing detection of such load applied.

With the foregoing arrangement, the tire T to be measured can be imparted with a load simulative of an actual load which would be applied to the tire installed on a vehicle while running on a road by moving the drum 1 upwardly or downwardly through operation of the manually actuatable handle HL. When the drum 1 is driven by the motor M, only the axial reactive load imposed in the radial direction while the tire is in rolling movement can be measured by the strain gages SG as a bending load acting on the movable member 3.

Figure 4:
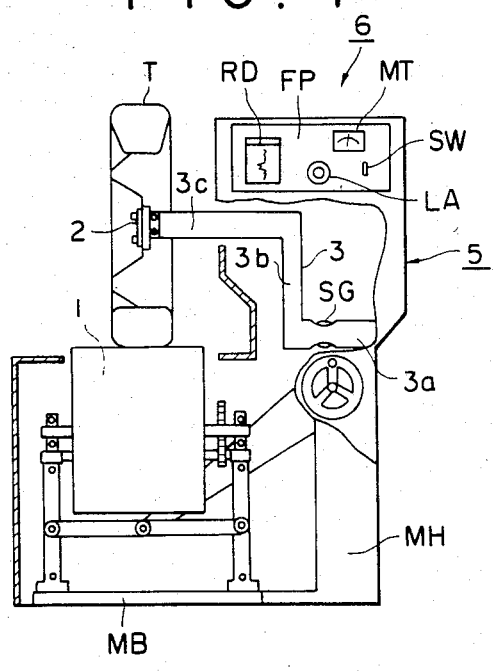

As shown in FIG. 4, the display means 6 is installed in an electric circuit container CS mounted on an upper portion of the support post MH having a sufficient rigidity and installed on the machine base MB. The container has a front panel FP on which there are mounted a recording unit RD, a meter MT, a switch SW, and a level adjustment dial LA.

Figure 5:
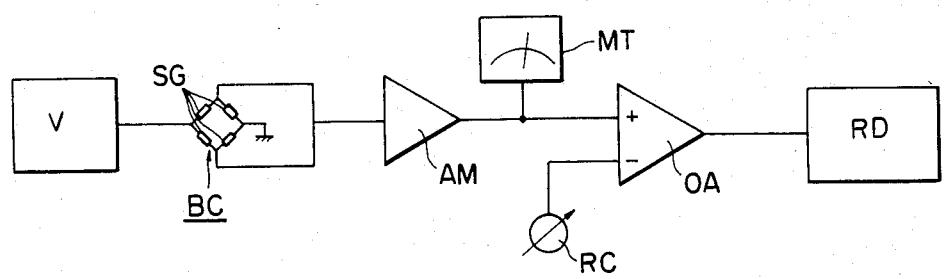

The display means 6 comprises an electric circuit as shown in FIG. 5.

A bridge circuit BC in which the strain gages SG are connected in full bridge form is energized by a voltage applied thereacross by a power supply V, and an output signal from the bridge circuit is amplified by an amplifier circuit AM. An amplified signal is displayed on the load display meter MT. The display meter MT is graduated with markings indicative of kilograms. The operator can give a desired setting for the load to be applied to the tire while observing an indication on the meter MT. The signal as amplified by the amplifier AM is supplied to an arithmetic processor circuit OA in which the signal is added to a given signal generated by a load setting circuit RC. The arithmetic processor circuit OA serves to subtract the signal indicated by the load display meter MT so as to pick up only the signal indicative of a force variation generated when the tire T is rotated. The resulting signal obtained by the subtraction is delivered to a force variation display and recording unit RD in which the signal is recorded on recording paper.

Thus, according to the tire uniformity measuring apparatus of the first embodiment, an R.F.V. waveform can clearly be displayed on the recording unit RD. Since a load is electrically detected by the strain gages SG, the apparatus according to the first embodiment is compact, can be manufactured less costly, and is of high practical advantage.

A tire uniformity measuring apparatus according to a second embodiment which belongs to the second aspect will now be described with reference to FIGS. 6 and 7.

The tire uniformity measuring apparatus according to the second embodiment has a movable member 13 in the form of a T-shaped balancing body movable only in a plane defined by the tire and drum axes and having a lower end pivotably mounted on a machine base. A tire T to be measured is rotatably mounted on an end of the movable member 13. The movable member 13 supports a load cell disposed near a center thereof remotely from the tire. The load cell serves to measure a reactive force acting on a shaft of the tire with the center of the tire being movable a small distance. The T-shaped movable member has a lower end pivotably mounted at a position in a horizontal plane containing an upper end of a surface in which the drum and the tire are held in contact with each other while in rolling movement. With this arrangement, a moment due to a lateral tire force generated normally to the direction of rotation of the tire can be reduced to zero so that only a component of a force variation in the radial direction of the tire can be detected by the load cell without suffering from any influence by such a moment. The reactive force acting on the tire shaft is correctly indicative of the R.F.V. (variation in the force in the radial direction of the tire) which is an optimum evaluation quality for tire uniformity. Tire nonuniformity can be quantized by measuring and recording such reactive forces.

The construction and operation of the tire uniformity measuring apparatus according to the second embodiment will be described in more detail.

The movable member 13 according to the second embodiment is composed of a first portion 131 and a second portion 133 which jointly assume a T shape. The first portion 131 has a lower end pivotablly supported by a shaft SP supported at its both ends on a support post MH and having an axis lying in the horizontal plane containing the upper end of the surface in which the drum and the tire are held in contact with each other while in rolling motion. The second portion 132 is spaced from the pivot of the first portion by a distance which is equal to the effective radius of the tire to be measured. The second portion 132 has on one end a support for rotatably supporting the tire T, and on the other end a counterbalance BW which is as heavy as the tire to be measured to counterbalance the tire with respect to the shaft SP of the movable member 13 for increased measurement accuracy.

Figure 6:
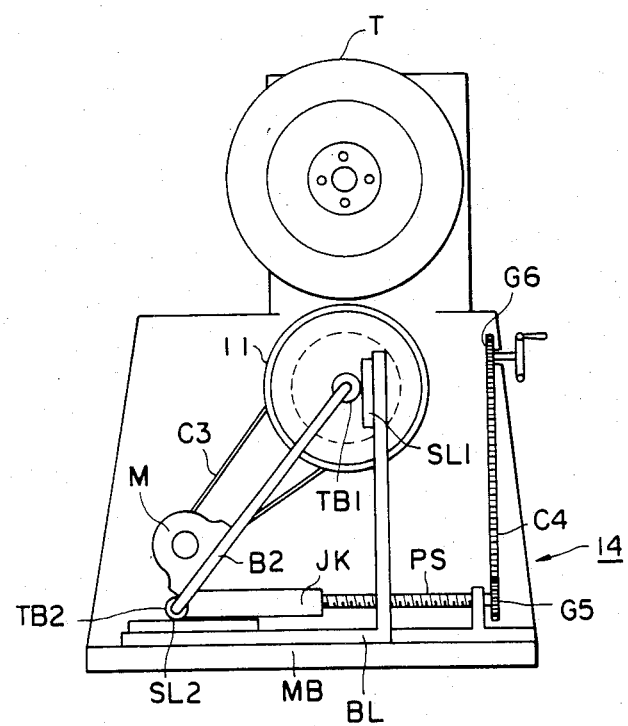
FIGS. 6 and 7 are side and front elevational views, respectively, of an apparatus according to a second embodiment of the present invention.

The tire uniformity measuring apparatus has a load applying means 14 which, as shown in FIG. 6, is mounted on the machine base MB and comprises a mount base B2 slidably smoothly on slide surfaces SL1, SL2 of an inverted L-shaped support table BL for driving the drum. The mount base B2 is rigid and has one end serving as a drum shaft supported by a bearing BE, as shown in FIG. 7, the ends of the drum shaft being slidable through single-row bearings TB1 on the slide surface SL1. A motor M is installed on the mount base B2 for driving the drum 11 having a diameter of 300 mm through a chain C3. The chain C3 is trained around a gear G3 and a driven gear G4 to drive the tire T to rotate at 5 revolutions per minute through selecting a gear ratio between the gears and RPM of the motor M. A pair of single-row bearings TB2 are mounted on the other end of the mount base B2 and slidable on the slide surface SL2. A jack JK is disposed centrally at the lower end of the mount base B2 for sliding the lower end of the mount base B2 back and fourth when driven by a drive screw DS extending through a bearing mounted on the machine base MB. The jack JK can be driven by rotating a handle HL journalled on the support post MH and disposed outside of the machine base through a chain C3 trained around gears G5, G6.

The load applying means 14 thus constructed can move the drum 11 upwardly or downwardly.

A displacement detecting means 15 comprises the load cell LC supported on the support post MH with a detecting end positioned near the junction between the first and second portions 131, 132 of the movable member 13 for detecting a displacement of the junction as a load.

The tire T to be measured is mounted for free rotation on a tire support device 12 mounted on one end of the second portion 132 of the movable member 13. A switch PS is attached near the tire support device 12 for generating a pulse signal indicative of rotation of the tire. The load cell LC is positioned such that its detecting end is located near the center of the second portion 132 of the movable member 13 remotely from the end thereof on which the tire is supported. The axes of the tire and drum are vertically aligned as shown. With the pivot of the first portion 131 of the movable member 13 in the form of the T-shaped balancing body being located in the horizontal plane containing the upper end of the surface in which the tire and the drum are held against each other while in rolling motion, the influence by the moment due to a lateral tire force generated perpendicularly to the direction of rotation of the tire can be eliminated by reducing the moment to zero, so that only a variation in the displacement or load in the radial direction of the tire can be detected.

By manually operating the handle HL to move the drum 11 upwardly or downwardly, the tire can be imparted with a load which simulates an actual load that would be imposed on the tire attached to a vehicle and running on a road. When the drum 11 is driven by the motor M, only a reactive load acting on the tire shaft radially of the tire can be detected by the load cell LC while the tire is rotating.

Figure 7:
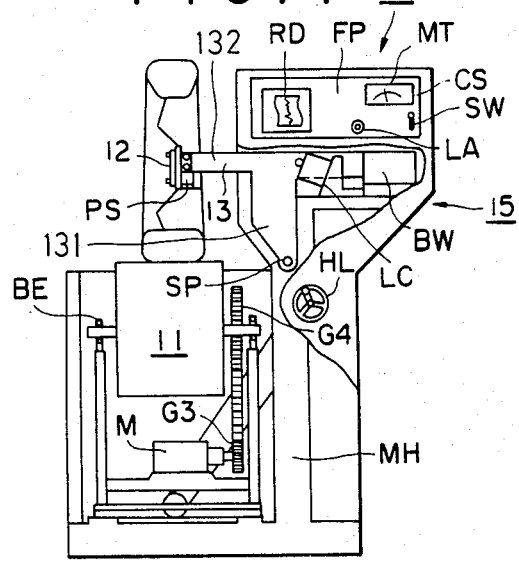

As illustrated in FIG. 7, the display means 16 is installed in an electric circuit container CS mounted on an upper end of the support post MH having a sufficient rigidity and supported on the machine base MB. The electric circuit container CS has a front panel FP supporting a recording unit RD, a meter MT, a switch SW, and a level adjustment dial LA.

The tire uniformity measuring apparatus according to the second embodiment is advantageous in that it can measure only a variation in force applied in the radial direction of the tire accurately and stably in a condition similar to actual conditions in which the tire is used.

The tire uniformity measuring apparatus of the second embodiment is also advantageous in that it can be handled and maintained with ease, takes up a small space as the drum and the tire are vertically arranged one above the other, and is compact, light in weight and inexpensive.

Since the movable member of the tire uniformity measuring apparatus of the second embodiment is in the form of the T-shaped balancing body combined with the load cell serving as the displacement detecting means, the apparatus can make measurements more stably than the apparatus according to the first embodiment.

The tire set in the apparatus of the second embodiment rotates at a speed of 5 revolutions per minute, which is much lower than that of tire in conventional apparatus. Accordingly, there is no need to make an effort to render the apparatus highly rigid. The drum has a diameter of 300 mm, a dimension which renders the apparatus small in size and light in weight.

A third embodiment of the present invention according to the present invention will be described with reference to FIGS. 8 through 10.

The tire uniformity measuring apparatus according to the third embodiment belongs to the second aspect, and has a drum and a tire positioned laterally with respect to each other with the tire being lowered in position so that the tire can be handled with ease. The apparatus has a movable member pivotably mounted through a pivot located in a plane in which lies a surface in which the drum and the tire are held in contact with each other while in rolling movement.

More specifically, the movable member 23 according to the third embodiment is composed of a first portion 231 and a second portion 232 which jointly constitute an L-shaped body. The first portion 231 has one end secured to a support post MH such that the axis of the first portion lies in the plane including the surface in which the drum and the tire contact each other. The first portion 231 is thus swingably supported. The second portion 232 has one end spaced from the pivot of the first portion 231 by a distance equal to the effective radius of the tire, and extends normally to the first portion. The other end of the second portion 232 has a support device for ratatably supporting the tire T to be measured.

Figure 8:
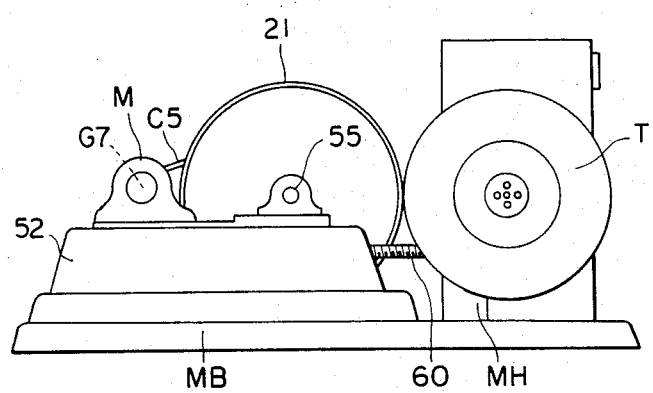
FIGS. 8 through 10 show an apparatus according to a third embodiment of tne present invention, FIG. 8 being a side elevational view of the apparatus, FIG. 9 a front elevational view thereof, FIG. 10 a plan view thereof.

As shown in FIG. 8, a load applying means 24 has a slide frame 52 of a U-shaped cross section including a slide surface 53 slidable on a guide surface 54 secured to the machine base MB along a fixed direction. A drum 21 is mounted on the slide frame 52 and movable back and forth into pressed engagement with the tire T.

Figure 9:
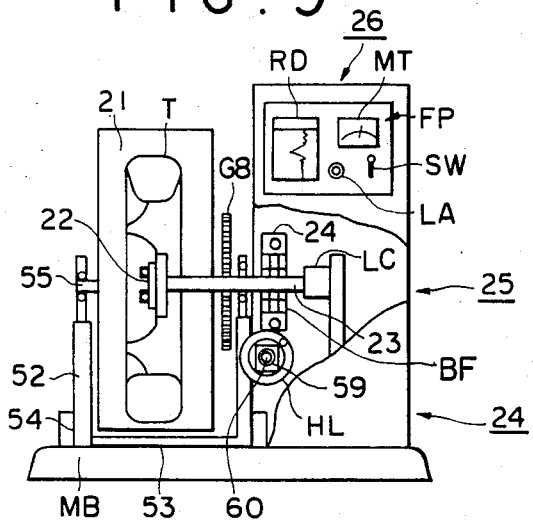
Figure 10:
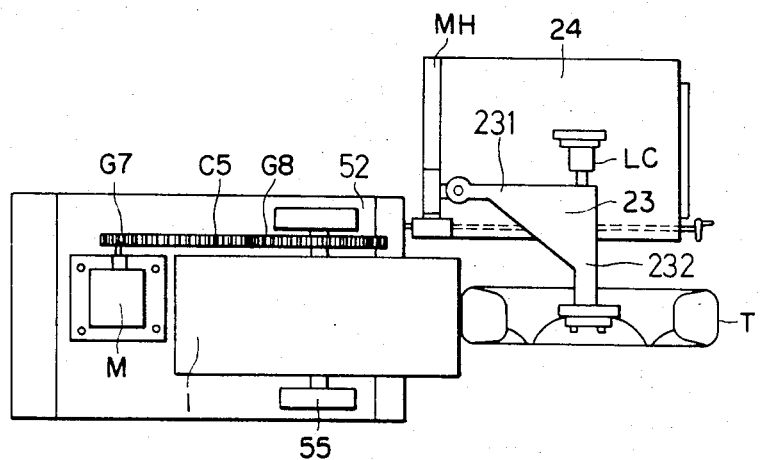

The slide frame 52 is rigid and has a drum shaft 55 supported at its front end by a bearing 55 as shown in FIG. 9. A motor M is mounted on a rear end portion of the slide frame 52. The drum 21 can be driven by the motor through a chain C5 trained around a drive gear G7 and a driven gear G8. The slide frame 52 has on its side a internally helically threaded portion 59 through which extends a drive screw 60 supported by a support post MH affixed to the machine base MB and having a manually actuatable handle HL. The slide frame 52 can be moved back and forth by rotating the handle HL to cause the slide surface 53 to slide along the guide surface 54.

With the load applying means 24 thus constructed, the drum 21 can be moved back and forth.

The displacement detecting means 25 is composed of a load cell LC for detecting as a load a displacement of the L-shaped movable member 23 supporting the tire T, as with the second embodiment. The first portion 231 of the movable member 23 is journalled by a bearing BF having a center lying in a plane containing the surface in which the tire T and the drum 21 are held against each other. The influence by the moment due to a lateral tire force generated perpendicularly to the direction of rotation of the tire can be eliminated by reducing the moment to zero, so that only a variation in the displacement or load in the radial direction of the tire can be detected. The load cell LC can therefore detect only a variation in the load applied radially of the tire.

As the drum 21 is moved back and forth with respect to the tire T, the movable member is also moved. Therefore, the load cell LC is positioned in a front-and-back direction with respect to the support post MH. The other construction is the same as that of the preceding embodiment, and hence will not be described.

Since the display means 26 is of the same structure as that of the second embodiment, no description thereof will be given.

When the drum 21 is manually moved back and forth by the handle HL, the tire is given a load which is simulative of an actual load which the tire would undergo when attached to a vehicle and running on a road. Upon the drum 21 being driven by the motor M, the load cell LC can detect a reactive load acting on the tire shaft while the tire is in rotation.

In response to a signal as detected by the load cell LC in the displacement detecting means 25, the display means 26 records variations in the load applied radially of the tire with a pen on chart paper in the recording unit RD.

The apparatus according to the third embodiment has the same advantages as those of the apparatus of the second embodiment, and is more advantageous than the latter in that it can be handled more easily.

A fourth embodiment of the present invention will be described with reference to FIGS. 11 and 12.

The tire uniformity measuring apparatus of the fourth embodiment belongs to the second, third and fourth aspects of the present invention. The tire uniformity measuring apparatus comprises a crank-shaped movable member including a second portion pivotably supported by a bearing having a center lying in a plane containing a surface in which a drum and a tire are held against each other, a first portion spaced from the second portion by a distance equal to the effective radius of the tire and having a support for rotatably supporting the tire, and a connector interconnecting the first and second portions and having a mechanism for adjusting the connector to a desired length.

The tire uniformity measuring apparatus according to the fourth embodiment will be described in more detail as to its construction and operation.

Figure 11:
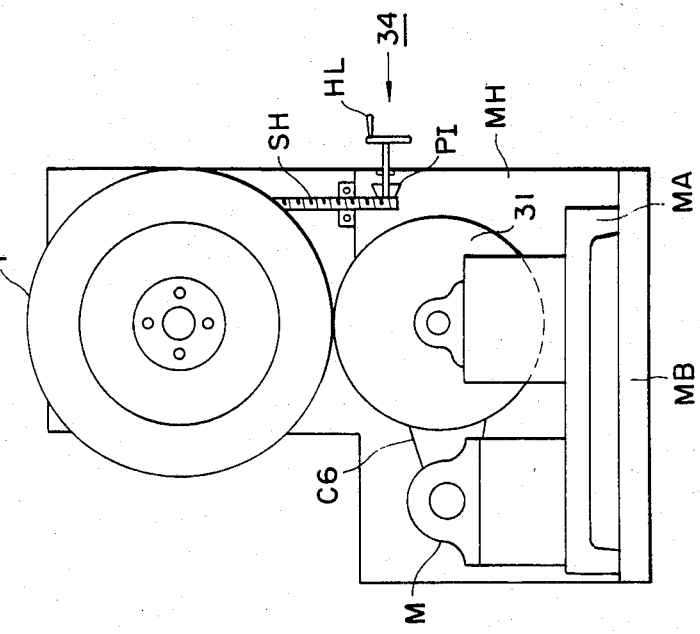
FIG. 11 is a side elevational view of an apparatus according to a fourth embodiment.

The movable member 33 according to the fourth embodiment is composed, as shown in FIG. 11, of a first portion 331 and a second portion 333 which are parallel to each other, and a connector 332 extending at a right angle to the first and second portions and interconnecting them together, the connector 332 having its length adjustable as desired. The first portion 331 is swingably supported by a shaft SH having both ends supported on seats on a machine base MB so that the first portion 331 has an axis lying in a plane containing a surface in which a drum and a tire are held against each other. The connector 332 comprises a lower portion 332a joined to the first portion and an upper portion 332b joined to the second portion. The lower and upper portions are vertically slidable with respect to each other to change the length of the connector as desired so that it will be equalized to the effective radius of the tire which is to be measured for its uniformity. During measurement, the upper and lower connector portions 332b, 332a are fixed together.

The second portion 333 extends parallel to the first portion 331 at a position spaced from the latter by a distance equal to the effective radius of the tire. The second portion 333 has a support at its distal end for rotatably supporting the tire to be measured.

The tire uniformity measuring apparatus has a load applying means 34 for imposing a relative load on the tire and the drum. The load applying means 34 is composed of a pinion gear PI and a drive shaft SH (FIG. 11), the pinion gear PI being drivable by a manual handle HL journalled on a support post MH and located exteriorly of the machine base. The load applying means 34 is also composed of a load imposing tension spring S and a spring support device SL (FIG. 12) drivable by the drive shaft SH. The load imposing tension spring S is sufficiently strong to press the tire T against the drum 31 with a predetermined load. The drum 31 is rigidly fixed to a base MA on the machine base MB and can be driven by a motor M via a chain C6 to rotate at a constant speed.

A displacement detecting means 35 has a tire support device 32 for rotatably supporting the tire, and a load cell LC having a displacement (force) detecting end located against a portion of the first portion 333 of the movable member 331 which lies in the plane containing the upper end of the surface in which the tire and the drum are held in mutual contact. The first portion 331 is pivotably supported by the bearing SP mounted on a seat fixed to the support post MH. The load cell LC is rigidly affixed in position. The detecting end of the load cell LC is semispherical in shape and received in a complementary semispherical hole in a detecting end of the first portion 331 of the movable member 33.

Figure 12:
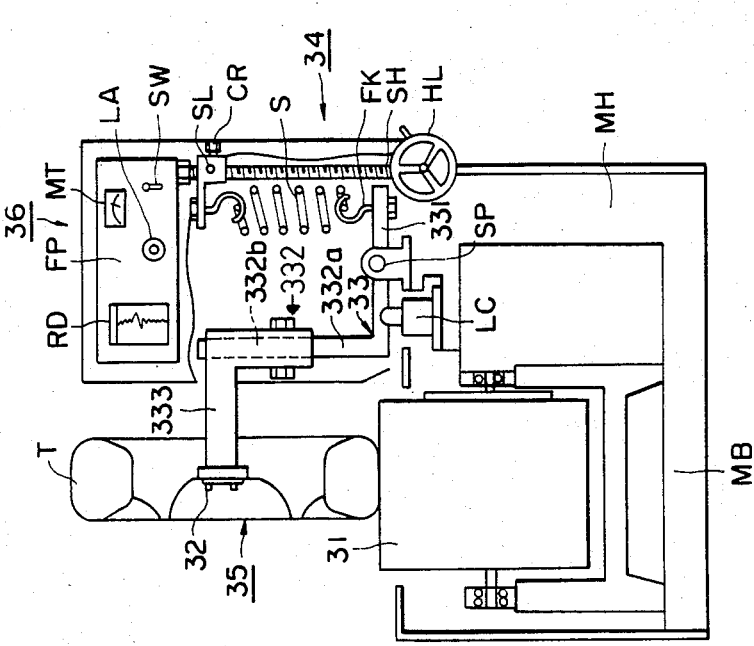
FIG. 12 is a front elevational view of the apparatus of the fourth embodiment.

As shown in FIG. 12, a display means 36 is installed in an electric circuit container mounted on an upper portion of the support post MH mounted rigidly on the machine base MB. The display means 36 includes a panel FP having a recording unit RD, a meter MT, a switch SW, and a lamp LA.

The tire T being measured rolls on the drum 31 which serves as an imaginary road surface, and is imparted with a load simulative of an actual load which would be imposed on the tire when the latter were installed on a vehicle and ran on a road by manually operating the handle HL to adjust the amount of displacement of the load imposing tension spring S attached to an end of the first portion 331 of the movable member 33. When the drum 31 is driven by the motor M, the load cell LC can detect a reactive force acting on the tire shaft radially of the tire when the latter is in rolling motion. The spring support device SL for the load imposing applying spring S can be secured in position by manually turning a screw of a clamp CR.

With the arrangement of the present invention, a surface (fulcrum) which is held against a displacement (force) detecting end of the movable member is located to lie in a plane containing a surface in which the tire and and the drum are held in contact with each other while in rolling movement, for thereby eliminating a moment due to a lateral tire force generated perpendicularly to the direction of rotation of the tire to remove any influence which would be caused by such a moment. Therefore, only a variation in the displacement (force) in the radial direction of the tire can be detected for deriving an R.F.V. value more accurately. Since the apparatus of the invention detects a load electrically, it can be rendered compact and is of a high practical advantage.

It should be understood that the present invention should not be limited to the above embodiments, and many changes in design and added modifications may be made without departing from the spirit of the appended claims.

What is claimed is:

1. A tire uniformity measuring apparatus comprising:
   a drum for rotatively driving a tire to be measured;
   a rotatable shaft having an attachment for securing the tire in position;
   a movable member rotatably supporting said rotatable shaft and being movable with respect to said drum about a fulcrum which lies substantially in a contact plane which includes the surface in which said drum and the tire meet as they are held against each other while in rolling movement, the axis of said fulcrum being positioned in a direction perpendicular to the axes of said drum and said tire, a said movable member including a portion capable of movement in dependence on a load acting between said drum and the tire being measured;

a load applying means for applying a predetermined load to the tire by changing the interaxial distance between said drum and said rotatable shaft by moving said drum;

a displacement detecting means for detecting a displacement of said rotatable shaft as a function of said movement of said movable member in dependence on a variation in a load applied radially to the tire while the latter is rotated by said drum; and display means for displaying the variation in the load applied radially of the tire in response to the displacement of said movable member;

whereby the variation in the load imposed on the tire can be measured.

2. A tire uniformity measuring apparatus according to claim 1, wherein said movable member comprises a cantilever having one end rigidly secured to a machine base and a support on the other end for rotatably supporting said rotatable shaft which is rotatable with the tire, said movable member also having, at a suitable position, a stress concentrating portion for allowing said movable member to move, said stress concentrating portion serving as said fulcrum about which said movable member is movable and being disposed substantially in said plane, said stress concentrating portion being mainly deformable when said cantilever is deformed in response to variation in a force applied radially on the tire.

3. A tire uniformity measuring apparatus according to claim 2, wherein said displacement detecting means comprises a strain gauge attached at a suitable position in a stress concentrating portion of the movable members.

4. A tire uniformity measuring apparatus according to claim 2, wherein said movable member is a crank-shaped member comprising first and second portions extending parallel to each other and a connector portion extending perpendicularly to the first and second portions and integrating them together, the first portion including said stress concentrating portion and having a center lying in a horizontal plane which includes said contact surface in which said drum and the tire are held against each other while in rolling movement, the first portion having one end secured to a support post so that the center of the stress concentrating portion is swingable.

5. A tire uniformity measuring apparatus according to claim 2, wherein said stress concentrating portion comprises a constructed region disposed between the upper and lower faces at a suitable position on the first portion of said movable member whose end is rigidly fixed to a support post, and said constricted region having strain gauges attached to the suitable position as said displacement detecting means.

6. A tire uniformity measuring apparatus according to claim 1, wherein said movable member comprises a swingable arm which is swingably supported at one point and having, on one end, a support for rotatably supporting said rotatable shaft which is rotatable with the tire, said swingable arm being pivotable about said fulcrum, and said movable member being swingable in response to variation in the radial force acting on the tire.

7. A tire uniformity measuring apparatus according to claim 6, wherein said load applying means is interposed between an end of said movable member which serves as the point which is swingably supported at a suitable position in the apparatus, whereby a predetermined load can be imposed on the tire by changing the distance between the axis of said drum and the axis of said rotatable shaft through said movable member.

8. A tire uniformity measuring apparatus according to claim 6, wherein said displacement detecting means comprises a load cell positioned so that its detecting end is located at a suitable location on the swing arm at a point remote from the end supporting the tire.

9. A tire uniformity measuring apparatus according to claim 6, wherein said movable member is a T-shaped member comprising first and second portions, the first portion including the fulcrum and the second portion being spaced from the fulcrum by a distance which is equal to the effective radius of the tire to be measured, and the second portion having, on one end, a support for rotatably supporting the tire and on the other end a counterbalance which is as heavy as the tire.

10. A tire uniformity measuring apparatus according to claim 6, wherein said movable member is an L-shaped member comprising first and second portions, the first portion being pivotably supported at a point which serves as the fulcrum, and the second portion having an end spaced from the fulcrum of the first portion by a distance equal to the effective radius of the tire and extending normally to the first portion, and the other another end of the second portion having a support device for rotatably supporting the tire to be measured, the first portion being swingably supported and and having one end secured to a support post so that the axis of the first portion lies in the plane including the surface in which the drum and the tire contact each other.

11. A tire uniformity measuring apparatus according to claim 1, wherein said movable member has an adjustment mechanism at a suitable position for adjusting the distance between said fulcrum and a support on the movable member for said rotatable shaft.

12. A tire uniformity measuring apparatus according to claim 11, wherein said adjustment mechanism comprises a connector comprising a lower portion, an upper portion, and a fixing portion, the lower and the upper portions being vertically slidable with respect to each other to change the length of the connector, the first portion and second portion of the movable member being parallel to each other, with the connector extending at right angles to each of the first and second portions and interconnecting them at a spacing which is adjustable as desired.

13. A tire uniformity measuring apparatus according to claim 11, wherein said load applying means for imposing a relative load on the tire and the drum comprises a gear and a drive shaft, the gear being drivable by a manual handle journalled on a support post and being located exteriorly of the machine base, a spring support movable by said drive shaft, and a load imposing tension spring , said spring having one end secured to one end of said movable member and the other end connected to said spring support.

14. A tire uniformity measuring apparatus according to claim 1, wherein said load applying means moves said drum in order to apply the predetermined load to the tire.

15. A tire uniformity measuring apparatus according to claim 14, wherein said drum is provided under the tire, in order to mount the tire on said drum.

16. A tire uniformity measuring apparatus according to claim 15, wherein said drum is rotatably mounted on a movable member of said load applying means.

17. A tire uniformity measuring apparatus according to claim 16, wherein said movable member comprises a swing member which is pivotably supported at one end for changing its position in the vertical direction in response to the angle of said swing member.

18. A tire uniformity measuring apparatus according to claim 16, wherein said movable member of said load applying means comprises a plate member which rotatably supports said drum, and jack means fixed to said plate member at one end thereof for changing the position of said plate member in the vertical direction.

19. A tire uniformity measuring apparatus according to claim 14, wherein said drum is positioned laterally relative to the tire.

20. A tire uniformity measuring apparatus according to claim 19, wherein said movable member comprises a swing member which is pivotably supported at one end for changing its position in the horizontal direction in response to the angle of said swing member.

* * * * *